No. 862,007. PATENTED JULY 30, 1907.
J. McGHIE & B. BLOOD.
STOVEPIPE.
APPLICATION FILED AUG. 21, 1906.

WITNESSES

INVENTORS
JOHN McGHIE
BURR BLOOD
BY
ATTORNEYS

THE NORRIS PETERS CO., WASHINGTON, D. C.

UNITED STATES PATENT OFFICE.

JOHN McGHIE AND BURR BLOOD, OF SPOKANE, WASHINGTON, ASSIGNORS TO SAFETY MANUFACTURING COMPANY, OF SPOKANE, WASHINGTON, A CORPORATION OF WASHINGTON.

STOVEPIPE.

No. 862,007.　　　　　Specification of Letters Patent.　　　　Patented July 30, 1907.

Application filed August 21, 1906. Serial No. 331,466.

*To all whom it may concern:*

Be it known that we, JOHN MCGHIE and BURR BLOOD, citizens of the United States, and residents of Spokane, in the county of Spokane and State of Washington, have invented certain new and useful Improvements in Stovepipes and other Pipes Used for Conducting Smoke or Hot or Bad Air, of which the following is a specification.

This invention is an improvement in stove and other pipe-joints and has for an object to provide a simple construction which can be easily made and which will effectually and safely couple the pipe sections so they may be conveniently detached when desired; and the invention consists in certain novel constructions and combinations of parts as will be hereinafter described and claimed.

Figure 1:
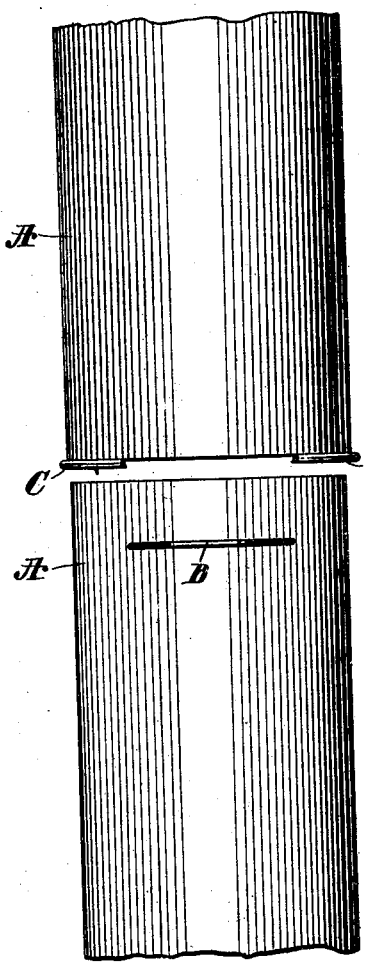
Figure 2:
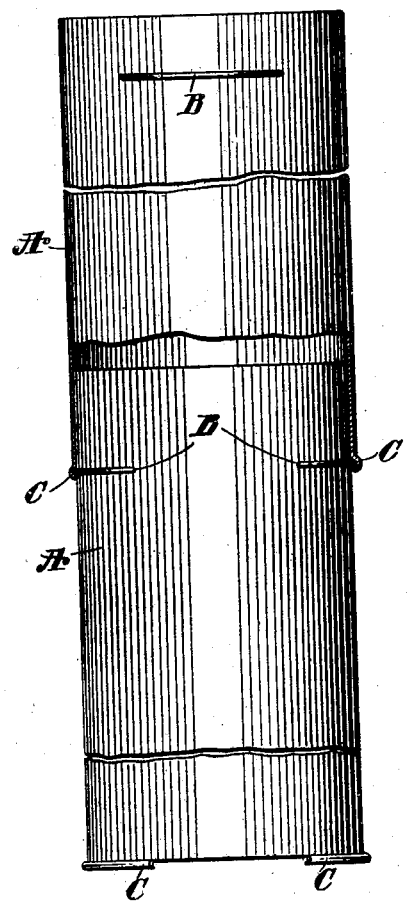

In the drawing Figure 1 is a side elevation of the pipe sections provided with my improvements with the sections detached, and Fig. 2 is a side elevation showing the sections connected, a portion of the tongue-bearing section being broken away.

In carrying out the invention we form the meeting ends of the pipe sections A with projecting beads B on one of the sections and with projecting hook-like tongues C on the other section. The beads B are pressed outwardly from the inner side of the section A at a point sufficiently back from the end of the pipe to secure the desired lap of the sections when fitted together, and these beads B extend in a direction at a right angle to the axis of the pipe section and are rounded and unobstructed at both ends so the tongue C may be adjusted into engagement with the beads from either end of the latter. We also space the beads B apart sufficiently to permit the fitting of the tongues C between them in connecting and disconnecting the sections, as will be more fully described hereinafter. The tongues C project from the extreme end of the pipe section A and are spaced apart sufficiently to receive between them the beads B in fitting the sections together, and these tongues C are curved in cross-section, as best shown in Fig. 2 into approximately a hook-like form coinciding with the cross sectional form of the beads B so the tongue C will receive the said beads when the parts are fitted together, as shown in Fig. 2.

The tongues and beads are stamped from their respective pipe sections and are so formed and arranged that when the sections are fitted together with the tongues C between the beads B, a quarter turn of one of the sections will adjust the tongues and beads into interlocking engagement, thus locking the sections together and avoiding the use of rivets or the like. The tongues C are alike at both ends, and, like the beads B, they extend at a right angle to the axis of the pipe sections so that in fitting the sections together the tongues may be slipped on their respective beads from either end of the latter, as will be understood from the drawing.

It will be understood that in practice the sections may be made with the tongues C at one end and the beads B at the other end for convenience in fitting the sections together as shown in Fig. 2.

We claim—

1. The improvement in stove and other pipe joints herein described, comprising the sections provided at their meeting ends one with beads projecting outwardly from its sides and extending on lines at a right-angle to the axis of the pipe and made approximately alike at both ends, and the other section having at its extremity tongues projecting beyond its ends and bent in hook form and made approximately alike at both ends and open at both such ends and adapted to fit over the beads of the meeting section, the beads and the tongues being spaced apart relatively whereby the tongues may fit between the beads in connecting and disconnecting the sections by rotating the same relatively, substantially as set forth.

2. The combination of the stove pipe sections, one of which is provided with beads projecting outwardly from its side and extending approximately at a right angle to the axis of the pipe section, and the other section having hooklike tongues to engage the beads the hook-like tongues being at the ends of their respective section whereby the meeting section when inserted at its end in the section having the tongues will be stopped by the abutment of its beads against the end of said first section in position for the beads to engage with the hook-like tongues of the first section, substantially as set forth.

3. The improvement in stove pipes herein described comprising a section provided at its extremity with hook-like tongues projecting beyond such extremity of said section and spaced apart and opening in a circumferential direction towards the intervening space, and a second section provided at a point back from its extremity with outwardly projecting beads adapted to pass into the spaces between the tongues of the first section and to be then turned rotarily into locking engagement with such tongues, said beads being arranged to abut the end of the first section between its hook-like tongues and form stops to limit the telescoping of the sections to a position in which the beads or projections may be adjusted by a rotary movement of said second section into engagement with the hook-like tongues.

JOHN McGHIE.
BURR BLOOD.

Witnesses:
　JOHN H. ROCHE,
　EMMA DANGS.